United States Patent [19]

Kay et al.

[11] Patent Number: 4,579,929
[45] Date of Patent: Apr. 1, 1986

[54] URETHANE COMPOSITIONS PREPARED VIA PREFORMED ADDUCTS

[75] Inventors: Edward L. Kay, Akron; Kenneth B. Roskos, Clinton, both of Ohio

[73] Assignee: The Firestone Tire & Rubber Company, Akron, Ohio

[21] Appl. No.: 724,842

[22] Filed: Apr. 18, 1985

[51] Int. Cl.⁴ .................. C08G 18/32; C08G 18/10
[52] U.S. Cl. ........................................ 528/65; 528/44; 528/67
[58] Field of Search ................... 528/44, 67, 65

[56] References Cited

U.S. PATENT DOCUMENTS 3,850,880  11/1974  Hakanson et al. ............ 260/75 NE
3,894,994   7/1975  Day et al. .................... 260/75 NE Primary Examiner—Herbert S. Cockeram
Attorney, Agent, or Firm—Daniel N. Hall

[57] ABSTRACT

Urethane compositions are prepared which contain preformed adducts. The preformed adducts are prepared by reacting a polyisocyanate with various polyols or amine analogs thereof whereby a product insoluble in the urethane prepolymer is produced. An intermediate polyol is added to produce a prepolymer. The cured urethane compositions have high low-strain moduli.

21 Claims, No Drawings

URETHANE COMPOSITIONS PREPARED VIA PREFORMED ADDUCTS

TECHNICAL FIELD

The present invention relates to the preparation of preformed adducts by reacting polyisocyanates with polyols or amine analogs thereof to yield an insoluble product. More specifically, the present invention relates to incorporation of said adducts in urethane prepolymers and curing or chain extension of said urethane prepolymers to form cured urethane compositions.

BACKGROUND

Heretofore, polyisocyanates have been reacted with a polyol or a polyamine to form respectively a urethane or a urea.

According to the present invention, it is advantageous when a urethane prepolymer contains a significant amount of unreacted polyisocyanate generally added to increase the overall "hard segment" content of the formulation. An additional advantage can be realized by adding an increment of the chain extender to the urethane prepolymer to form a polyisocyanate/extender adduct which is insoluble in the urethane prepolymer. By this technique, the molecular weight of the adducts is held to a minimum as compared to the conventional procedure of adding all of the chain extender to a prepolymer at one time.

SUMMARY OF THE INVENTION

It is thus an aspect of the present invention to provide a urethane composition, wherein said adducts are initially prepared utilizing a large excess of a polyisocyanate and subsequently adding an intermediate to form a urethane prepolymer.

It is yet a further aspect of the present invention to provide a urethane composition, as above, which has improved high low-strain moduli.

In general, a urethane composition containing preformed adducts comprises a urethane composition, said urethane composition having from about 0.5 to about 40.0% by weight of the preformed adducts therein based upon the weight of said urethane prepolymer composition.

PREFERRED EMBODIMENTS

The present invention relates to a process for forming as well as a product incorporating preformed polyisocyanate-chain extender adducts in polyurethane formulations. Cured polyurethanes prepared from these formulations have higher low-strain moduli values in comparison with formulations not containing the preformed adducts. Inasmuch as the compositions of the present invention as well as compositions not containing the preformed adducts (controls) will have approximately the same weight percent of hard segments, the formulations of the present invention have higher low-strain moduli with comparable hard segment content.

The preformed adducts are prepared by reaction of a polyisocyanate with various polyols or amine analogs thereof whereby an insoluble adduct product is formed. Considering the polyisocyanates, suitable compounds include those having the formula $R-(N=C=O)_n$, where R can be an aliphatic containing from about 2 to about 20 carbon atoms, a cycloaliphatic containing from 4 to about 20 carbon atoms, an aromatic containing from 6 to about 20 carbon atoms, or combinations thereof, as for example, alkyl-substituted aromatics. Desirably R is an aromatic or an alkyl substituted aromatic group having from 6 to 14 carbon atoms. The number of isocyanate units, that is "n" is an integer such as 2, 3 or higher with 2 being highly preferred. Examples of polyisocyanates include the following as well as isomers thereof; diphenyl diisocyanates; 2,4,4'-triisocyanate diphenyl ether; triphenylmethane triisocyanate; benzene-1,2,4-triisocyanate; naphthalene-1,3,7-triisocyanate and the like. Highly preferred polyisocyanates include meta or para-phenylene diisocyanate; diphenylmethane diisocyanates; bitolylene diisocyanates; dianisidine diisocyanates; isophorone diisocyanates; toluene diisocyanates; hexamethylene diisocyanate; pentamethylene diisocyanate; and MDI; that is 4,4'-diphenylmethane diisocyanate.

The adduct forming compounds generally yield an insoluble adduct in the polyisocyanate solution. By the term "insoluble" is meant that a visible precipitate forms. Naturally, the insolubility of the aduct will tend to vary with the type of the diisocyanate as well as the type of adduct forming compound, for example the polyol. Generally, a significant amount of the preformed adduct is precipitated from the diisocyanate solution. The adduct forming compounds are generally highly polar compounds such as various low molecular weight polyols or amine analogs thereof. Such polyols or amine analogs thereof can be aromatic, aliphatic, or combinations and generally have from about 2 to about 12 carbon atoms and preferably from about 4 to about 8 carbon atoms. Suitable types of polyols which produce insoluble adducts with diisocvanates include low molecular weight alkyl diols such as ethylene glycol, 1,3-propanediol, 2-methyl-1,3-propanediol, 1,4-butanediol, and the like. Amine analogs of such polyols can also be used as well as mixed amine/ols such as ethanol amine, 3-aminopropanol and the like. Aromatic amines such as o, m or p-phenylenediamine and the like can also be used. Aminophenols such as o, m or p-aminophenol and the like can also be used. Additionally, trifunctional alcohols such as glycerine, trimethanol propane, [2-ethyl-(hydroxymethyl)-1,3-propanediol] and the like can also be used. Trifunctional amines as well as trifunctional mixed ol/amines can also be used.

As indicated previously, the reaction between the polyisocyanate and the adduct forming compound is carried out at a temperature such that the polyisocyanate is a liquid. Generally such a temperature is from about 20° to about 100° C., with from about 20° C. to about 60° C. being preferred. The total amount of adduct forming compounds such as a polyol if from about 0.5% to about 40% with from about 5.0% to about 20% being preferred expressed as a weight percent of the theoretical amount of extender utilized. In other words, the amount of adducts based on the total weight of the urethane composition containing the prepolymer and chain extenders therein, or the cured urethane composition, is from about 0.5% to about 40.0% by weight, and from about 5.0% to about 20.0% by weight being preferred.

The adducts are relatively easily prepared by adding the extender to a polyisocyanate. The reaction is exothermic and advantageously the adducts are prepared by first dissolving the extender and polyisocyanate in appropriate solvents and mixing the solutions to form the adducts. The intermediate can then be added and the solvent removed by any convenient means such as distillation. The basic requirements of the solvent used is that the solvent should be non-reactive with isocyanate functions. Such solvents such as dimethy-, diethyl-, dipropyl, dibutyl ethers and isomers should be suitable. Cyclic ethers such as tetrahydrofuran should be useful.

As will be disclosed hereinbelow, the adducts can be prepared without a solvent present. This is, the neat extender can be added to the polyisocyanate which is in excess of the theoretical amount required to form the adduct; thus the excess polyisocyanate can function as a reaction medium as well as a dispersing medium for the adducts formed. In addition, non-reactive hydrocarbons and the like which are not good solvents for the extender or polyisocyanate can be used as the reaction medium to aid in dissipating the heat evolved from the exothermic reaction and dispersing the adducts.

Generally, the adduct forming compound such as the polyol is added at a rate to maintain the reaction temperature. As the exothermic reaction proceeds, the polyisocyanate-polyol adducts are formed and they will precipitate. The reaction is allowed to proceed until completion which is usually a temperature of from about 20° to about 100°.

After the adducts have been formed, the urethane prepolymer is formed by addition of the desired urethane intermediate to the adduct/excess polyisocyanate. The mixture of adduct/excess polyisocyanate intermediate is usually heated under vacuum for a specified time at a conventional temperature. If a solvent is used to moderate the exotherm, the desired urethane intermediate may be added to the adduct/excess polyisocyanate solvent and then the solvent can be removed as, for example, by distillation. Alternatively, as noted above, the solvent can be removed and then the desired urethane intermediate added. In any event, the next procedural step is to form the prepolymer.

It will be obvious that once the adduct has been made, the same reaction mixture will also desirably contain a large excess of the polyisocyanate and can be utilized for preparation of the prepolymer. Should the preformed adducts not contain an excess, suitable polyisocyanate, preferably diisocyanates as of the same type set forth above are added to form an excess. Then, an intermediate polymer having hydroxyl or amine end groups thereon is added and reacted with the excess polyisocyanate, desirably a diisocyanate and henceforth hereinafter referred to as a diisocyanate although it can be a triisocyanate or the like. The intermediate or low molecular weight polymer containing hydroxyl or amine end groups utilized in accordance with the present invention is characterized by two or more hydroxyl and/or amine groups which react with isocyanate functions of a diisocyanate. Generally, the hydroxyl and/or amine functions are limited to two per molecule as well as two isocyanates per molecule of polyisocyanate to obtain a linear (non-cross link) polyurethane when cured with a difunctional curing or chain extending agent. If a cross linked polyurethane is desirable, a trifunctional agent can be utilized such as a triol, triamine, triisocyanate or trifunctional extender.

Various types of polyurethane intermediates as well known to the art. Generally, any conventional intermediate can be utilized such as a low molecular polymer, e.g. a polyester, a polyether, or a mixed polyesterpolyamide. Examples of suitable intermediates include poly(isobutene)diol, poly(butadiene)diol, poly(oxyethylene)diol, poly(oxypropylene)diol, poly(oxybutylene)diol, poly(caprolactone)diol, polyester diols and the like as well as the triols and analogous amine derivatives. Also suitable are blends of the foregoing intermediates.

EXPERIMENTAL PROCEDURES

1. Preparation of Prepolymers: The general procedure for the preparation of prepolymers was to add molten MDI (ca. 40° C.) to the intermediate or blend of intermediates. The MDI/polyol was then heated under vacuum (5 Torr) for 30 minutes at 100°–110° C., cooled and stored under an anhydrous nitrogen atmosphere at 40° C.

An alternative method was to add the MDI at 70° C. and heat the reaction mixture for two hours at 70° C. The prepolymer was stored under anhydrous nitrogen at 40° C.

The amount of MDI added to the polyols was calculated as follows:

(1) Based upon the hydroxyl numbers of the urethane intermediate, the number of moles of the hydroxyl function is calculated.

(2) The moles of hydroxyl function are then converted to weight or diisocyanate in a ratio of [OH]/DIISOCYANATE.

(3) The weight of diisocyanate required to obtain a desired level of "free NCO" (the amount of NCO function that theoretically would not have reacted during the polymer formation) is calculated.

(4) The weight of diisocyanate calculated in paragraphs (2) and (3) immediately above is the total amount of diisocyanate used in the formation of the prepolymer.

As noted, the prepolymer can be prepared in accordance with any conventional manner and the above described adducts added thereto. Alternatively, the formation of the preformed adducts utilizes a large excess of a diisocyanate as noted above. The amount of such diisocyanate is as stated above (see paragraph 4). The diisocyanate accordingly also functions as a liquid medium for the formation of the adducts as well as a dispersant medium therefor, and for the intermediates which, when added thereto, form the prepolymer.

The amount of the intermediate or low molecular weight polymer which serves to dilute the adducts was the total amount to be used in the overall reaction, that is for example the amount set forth in item (1) set forth above. The mixture of the excess diisocyanate, the adducts, and the intermediate usually forms a slurry which is heated to effect the reaction of the excess diisocyanate present with the intermediate to form the prepolymer. Reaction temperature of the prepolymer formation reaction is usually from about ambient to about 110° C. with from about 40° C. to about 70° C. being preferred. The reaction can take place under vacuum for a sufficient amount of time such that the reaction is essentially completed. The final reaction mixture contains a dispersion of the adducts in the prepolymer along with free diisocyanate. This reaction mixture can be cooled and stored under anhydrous nitrogen as at 40° C. until chain extended and cured.

In preparing the urethane compositions of the present invention, generally the amount of diisocyanate utilized is such that an excess amount remains after the prepolymer is formed or after the adducts are added to a prepolymer solution. Alternatively, additional diisocyanate can be added. The amount of such free diisocyanate is generally expressed as "free isocyanate" (NCO) and as a weight percent of the prepolymer calculated as NCO and ranges from about 1.0% to about 20%, more typically from about 4% to about 16% and usually from about 8% to about 12% NCO groups based upon a total weight of the prepolymer.

In chain extending and curing the prepolymer urethane composition containing the preformed adducts therein, conventional chain extending or curling agents can be utilized. Generally, these agents are the same as the adduct forming compounds set forth above and accordingly are hereby fully incorporated by reference. That is, they can be polyols or amine analogs thereof. A preferred chain extension-curing agent is butanediol-1,4.

The amount of the chain extending or curing agent used is such that the equivalent OH/NCO ratio is from about 0.80 to about 1.2, desirably from about 0.95 to about 1.05 and preferably about 1.0. The chain extension reaction is desirably carried out in the presence of an inert anhydrous gas. The temperature is from about ambient up to the boiling point of the curing agent, for example about 180° C., with from about 30° C. to about 100° C. being preferred. The final product is a relatively highly chain-extended polyurethane composition having hard, that is urethane linkages or sites therein. The overall result is an improved high-low strain modulus over urethane compositions made in a conventional manner. Accordingly, the urethane compositions of the present invention containing the preformed adduct therein can be used in various molded items, cast tires, and generally in urethane systems wherein such a property is desired.

As a matter of full disclosure, chain extension temperature is defined as the temperature of the prepolymer/adduct mixture at which the chain extender is added. The cure temperature is defined as the temperature of the mold into which the chain-extended prepolymer is charged to effect a final cure (additional chain extension). Generally the cure temperature is from about 100° C. to about 200° C., desirably from about 130° C. to about 180° C. and from about 140° C. to about 160° C.

The invention will be better understood by reference to the following procedures.

1. Preformed Bis(MDI)BDO Adducts and Prepolymer Formation

The preparation of preformed bis(MDI)BDO (butanediol) adducts was effected by the addition of BDO to molten MDI at ca. 40° C. (ca. melting point of the MDI). The BDO was added at a rate to maintain a reaction temperature of about 40°-45° C. As the exothermic reaction proceeded, the bis(MDI)BDO adducts precipitated as a white solid. The reaction was allowed to proceed until the reaction temperature reached about 50°-60° C. at which time the required amount of intermediate was added to dilute the reaction mixture and disperse the adducts.

The amount of MDI used was usually the total amount of MDI calculated as stated previously (see item 4) to ensure an excess of MDI to complete the reaction with BDO as well as function as a liquid medium to disperse the adducts. The amount of BDO charged can be varied over a considerable range and was calculated as a weight percent of the theoretical amount of BDO required in the overall reaction to a cured polyurethane to attain a stoichiometry of OH/NCO=1.00. Thus the range would be from about 1% to 40%, preferably 5% to 20% expressed as a weight percent of the theoretical amount of extender. In the disclosed experiment, the BDO used in the preformed bis(MDI)BDO adducts formation was 10% by weight of the theoretical BDO required in the overall reaction.

The amount of intermediate added to dilute the MDI/bis(MDI)BDO adducts slurry was the total amount to be used in the overall reaction (see item (1) of the preceding section).

The intermediate bis(MDI)BDO adduct slurry was then heated under vacuum (<5 Torr) for 30 minutes at 100°-110° C. to effect the reaction of the excess MDI present with the intermediate to form a prepolymer. The final reaction mixture consisting of a dispersion of bis(MDI)BDO adducts in the prepolymer/excess MDI was cooled and stored under anhydrous nitrogen at 40° C. until chain extended as described following.

2. Chain Extension/Cure Conditions

The white opaque slurry of bis(MDI)BDO adducts prepolymer MDI was degassed under vacuum (<5 Torr) and the remaining amount of BDO added at about 40°-50° C. and the reaction mixture again degassed and transferred to a 6"×6"×0.075" mold. The mold was then placed in a Wabash hydraulic press and cured at 140° C. for 30 minutes at a gauge pressure of 10 to 15 tons.

3. Physical Testing

The 5% moduli values reported in Tables II, III and IV were determined on an Instron Test Machine using test procedures generally accepted in the rubber and plastics industries.

EXPERIMENTAL RESULTS

Data in Table II demonstrates the beneficial effects of incorporating preformed bis(MDI)BDO adducts in a polyurethane prepolymer based on a poly(oxypropylene) triol containing a poly(oxyethylene) glycol endblock.

Experiments Nos. 1 and 2 are controls, which did not contain preformed bis(MDI)BDO adducts, were formulated at 9.0 and 10.0% free NCO, respectively. Experiments Nos. 3, 4, 5 and 6 were formulations containing bis(MDI)BDO adducts equivalent to 10% of the theoretical BDO required to attain a stoichiometry of OH/NCO=1.00.

It is noted that the 5% moduli of the control containing 9.0% free NCO (experiment No. 1) was less than the formulation containing the bis(MDI)BDO adducts and formulated at 8.0% free NCO (experiment No. 3). Experiment No. 4 which contained the adducts and was formulated at 9.0% free NCO comparable to the control (experiment No. 1) resulted in a cured polyurethane having significantly higher 5% moduli values than the control. In all experiments, the cured polyurethanes formulated with the bis(MDI)BDO adducts had 5% moduli values higher than the controls which were not formulated with the preformed adducts.

Control and experimental formulations based on MDI prepolymers of a blend of Voranol 5148/Voranol 2120 (70/30 by weight) are shown in Table III.

Interpretation of the experimental data again demonstrates the beneficial effect of the bis(MDI)BDO adducts of increasing the 5% moduli values at comparable free NCO levels. It is noted that the formulations containing the bis(MDI)BDO adducts formulated at 9.0% and 10.0% free NCO (experiment Nos. 11 and 12, respectively) resulted in cured polyurethanes having 5% moduli values significantly higher than the moduli values obtained on the controls formulated at 10.0% and 11.2% free NCO (experiment Nos. 7 and 8, respectively).

Table IV contains data on formulations based on polyurethane MDI prepolymers of a 90/10 by weight polyol blend of Voranol 5148/Carbowax 400. The free NCO level of the controls was varied from 9.0% to 12.0% and that of the experimental formulations containing the preformed bis(MDI)BDO adducts from 8.0% to 11.0% free NCO. As was the case with the previous experiments discussed in Tables II and III, the experimental formulations containing the preformed bis(MDI)BDO adducts (experiments Nos. 17-20) resulted in cured polyurethanes having significantly higher 5% moduli values than the controls which contained no preformed adducts and were formulated at comparable free NCO levels. In most cases, the formulations containing the preformed adducts gave cured polyurethanes having 5% moduli values higher than the control formulations at a 1.0% higher free NCO level. The one exception is at the 10% NCO level (experiment No. 19) which gave a 5% modulus value of 655 psi as compared to the control (experiment No. 15) which gave a 5% modulus value of 670 psi at 25° C.

TABLE I

Identification of Polyols and Reagents

Voranol 5148, a product of Dow Chemical identified as a poly(oxypropylene) triol having approximately 20% poly(oxyethylene glycol endblock; 7000 nominal molecular weight.

Voranol 2120, a product of Dow Chemical identified as a poly(oxypropylene) glycol; 2000 nominal moleculr weight.

Carbowax 400, a product of Union Carbide Corporation identified as a poly(oxyethylene)glycol; 400 nominal molecular weight.

MDI; 4,4'-diphenylmethane diisocyanate; a product of Upjohn Company

BDO; butanediol-1,4; a product of E. I. dupont de nemours & Company Chemical.

TABLE II

Preformed Bis(MDI)BDO Adducts
Voranol 5148; OH/NCO = 1.00

| | Experiment No. | | | | | |
|---|---|---|---|---|---|---|
| | 1 | 2 | 3 | 4 | 5 | 6 |
| Preformed Adducts as a % of Theoretical BDO Extender | — | — | 10.0 | 10.0 | 10.0 | 20.0 |
| % Free NCO | 9.0 | 10.0 | 8.0 | 9.0 | 10.0 | 10.0 |
| 5% Modulus, psi, At | | | | | | |
| 25° C. | 260 | 410 | 290 | 460 | 520 | 505 |
| 100° C. | 180 | 305 | 245 | 355 | — | 405 |

TABLE III

Preformed Bis(MDI)BDO Adducts
Voranol 5148/Voranol 2120, 70/30 By Weight; OH/NCO = 1.00

| | Experiment No. | | | | | |
|---|---|---|---|---|---|---|
| | 7 | 8 | 9 | 10 | 11 | 12 |
| Preformed Adducts as a % of Theoretical BDO Extender | — | — | — | 10.0 | 10.0 | 10.0 |
| % Free NCO | 10.0 | 11.2 | 12.0 | 8.0 | 9.0 | 10.0 |
| 5% Modulus, psi, At | | | | | | |
| 25° C. | 345 | 465 | 685 | 275 | 430 | 600 |
| 100° C. | 245 | 330 | 450 | 230 | 345 | 470 |

TABLE IV

Preformed Bis(MDI)BDO Adducts
Voranol 5148/Carbowax 400, 90/10 By Weight; OH/NCO = 1.00

| | Experiment No. | | | | | | | |
|---|---|---|---|---|---|---|---|---|
| | 13 | 14 | 15 | 16 | 17 | 18 | 19 | 20 |
| Preformed Adducts as a % of Theoretical BDO Extender | — | — | — | — | 10.0 | 10.0 | 10.0 | 10.0 |
| % Free NCO | 9.0 | 10.0 | 11.0 | 12.0 | 8.0 | 9.0 | 10.0 | 11.0 |
| 5% Modulus, psi, At | | | | | | | | |
| 25° C. | 225 | 390 | 670 | 830 | 385 | 505 | 655 | 885 |
| 100° C. | 165 | 330 | 440 | 580 | 300 | 390 | 505 | 610 |

While in accordance with the patent statutes, a best mode and preferred embodiment has been set forth in detail, the scope of the invention is limited by the scope of the attached claims.

What is claimed is:

1. A urethane composition containing a preformed adduct; comprising:
   a urethane composition, said urethane composition having from about 0.5% to about 40.0% by weight of the preformed adduct therein based upon the weight of said urethane composition, said preformed adduct being the insoluble product of (A) a polyisocyanate having the formula R—(N═C═O)$_n$ where R is an aliphatic group having from 2 to 20 carbon atoms, a cycloaliphatic group having from 4 to 20 carbon atoms, an aromatic or an alkyl substituted aromatic group having from 6 to 20 carbon atoms, and wherein n is 2 or 3, and (B) an adduct forming compound.

2. A urethane composition according to claim 1, wherein said adduct forming compound is a polyok, an amine analog thereof, or an aromatic amine.

3. A urethane composition according to claim 2, wherein the amount of said insoluble adduct is from about 5.0% to about 20.0% by weight based upon the weight of said urethane composition and wherein said polyol, said amine analog thereof and said aromatic amine has a total of from 2 to 12 carbon atoms.

4. A urethane composition according to claim 3, wherein said urethane composition is a prepolymer.

5. A urethane composition according to claim 3, wherein R of said polyisocyanate is an aromatic group or an alkyl substituted aromatic group having from 6 to 14 carbon atoms, wherein n is 2, and wherein said polyol, said amine analog thereof, and said aromatic amine have a total of from 4 to 8 carbon atoms.

6. A urethane composition according to claim 5, wherein said adduct forming compound is butane diol.

7. The cured urethane composition of claim 2.

8. A urethane composition according to claim 1, wherein said urethane composition is a prepolymer.

9. The cured urethane composition of claim 1.

10. A process for preparing a urethane composition having urethane preformed adducts; comprising the steps of:

adding a polyisocyanate to a reaction vessel, said polyisocyanate having the formula R—(N=C=O)$_n$ where R is selected from a group consisting of an aliphatic having from 2 to 20 carbons, a cycloaliphatic having from 4 to 20 carbon atoms, an aromatic or an alkyl substituted aromatic having from 6 to 20 carbon atoms, and wherein n is 2 or 3;

adding an adduct forming compound to said reaction vessel, and reacting said polyisocyanate and said adduct forming compound and forming aminsolude preformed adduct.

11. A process according to claim 10, wherein a stoichometric excess of said polyisocyanate is present.

12. A process according to claim 11, including the further step of adding a urethane intermediate to said vessel and forming a prepolymer.

13. A process according to claim 12, wherein the amount of said insoluble adduct is from about 0.5% to about 40.0% by weight based upon the weight of said urethane composition, and wherein said composition contains from about 1.0% to about 20% by weight of free isocyanate (NCO) as a weight percent of said prepolymer.

14. A process according to claim 13, wherein said adduct forming compound is a polyol, an amine analog thereof, or an aromatic amine.

15. A process according to claim 14, including the further step of adding chain extending agents and curing said prepolymer urethane composition, said chain extending agents being a polyol, an amine analog thereof, or an aromatic amine.

16. A process according to claim 14, wherein the amount of said insoluble adduct is from about 5.0% to about 20.0% by weight and wherein said adduct forming compound is said polyol, said amine analog thereof, or said aromatic amine having a total of from 2 to 12 carbon atoms.

17. A process according to claim 15, wherein the amount of said free isocyanate (NCO) is from about 8% to about 12% by weight, wherein the amount of said insoluble adduct is from about 5.0% to about 20.0% by weight and wherein said adduct forming compound is said polyol, said amine analog thereof, or said aromatic amine having a total of from 2 to 12 carbon atoms.

18. A process according to claim 14, wherein said adduct forming reaction temperature is from about 20° C. to about 100° C.

19. A process according to claim 15, wherein said adduct forming reaction temperature is from about 20° C. to about 100° C.

20. A process according to claim 17, wherein said R of said polyisocyanate is an aromatic group or an alkyl substituted aromatic group having from 6 to 14 carbon atoms, wherein n is 2, and wherein said polyol, said amine analog thereof, and said aromatic amine have a total of from 4 to 8 carbon atoms.

21. A process according to claim 20, wherein said adduct forming compound is butane diol.

* * * * *